(12) United States Patent
Pitchenik et al.

(10) Patent No.: US 6,260,144 B1
(45) Date of Patent: Jul. 10, 2001

(54) METHOD FOR VERIFYING THE EXPECTED POSTAL SECURITY DEVICE IN A POSTAGE METERING SYSTEM

(75) Inventors: David E. Pitchenik, Fairfield; Robert A. Cordery, Danbury; Frederick W. Ryan, Jr., Oxford, all of CT (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 08/754,568

(22) Filed: Nov. 21, 1996

(51) Int. Cl.$^7$ ..................................................... H04K 9/00
(52) U.S. Cl. ........................ 713/169; 705/61; 705/60; 705/64; 705/66; 380/51
(58) Field of Search ............................. 380/21, 23, 25, 380/51, 277, 281, 282, 284, 285; 705/401, 403, 404, 405, 60, 61, 62, 73, 75, 408

(56) References Cited

U.S. PATENT DOCUMENTS

| | | | |
|---|---|---|---|
| 4,845,632 | 7/1989 | Kroll et al. | 364/464.02 |
| 4,958,291 | 9/1990 | Mamone et al. | 364/464.02 |
| 5,299,263 | 3/1994 | Beller et al. | 380/30 |
| 5,319,562 | 6/1994 | Whitehouse | 364/464.03 |
| 5,491,750 * | 2/1996 | Bellare et al. | 380/21 |
| 5,510,992 | 4/1996 | Kara | 364/464.02 |
| 5,606,613 * | 2/1997 | Lee et al. | 380/21 |
| 5,612,889 * | 3/1997 | Pintsov et al. | 364/468.14 |
| 5,625,694 | 4/1997 | Lee et al. | 380/23 |
| 5,655,024 | 8/1997 | Bell et al. | 380/51 |
| 5,666,284 | 9/1997 | Kara | 705/402 |
| 5,708,712 | 1/1998 | Brinkmeyer et al. | 380/23 |
| 5,742,683 * | 4/1998 | Lee et al. | 380/23 |
| 5,745,576 * | 4/1998 | Abraham et al. | 380/25 |
| 5,774,550 | 6/1998 | Brinkmeyer et al. | 380/21 |
| 5,805,711 | 9/1998 | Windel et al. | 380/55 |
| 5,850,444 * | 12/1998 | Rune | 380/21 |

FOREIGN PATENT DOCUMENTS

| | | |
|---|---|---|
| WO | 3/1988 | (WO). |
| 0148960 | 12/1983 | (EP). |
| 0661844 A2 | 12/1994 | (EP). |

OTHER PUBLICATIONS

Schneier, Applied Cryptography, 2$^{nd}$ edition, p. 37, basic protocol under the section "Signing Documents with Public–key Cryptography."

Alfred J. Menezes, Paul C. Van Oorschot and Scott A. Vanstone *Handbook of Applied Cryptography*, CRC Press, pp. 560–561, 1996.*

Fumy & Landrock, "Principles of Key Management", IEEE Journal on Selected Areas in Communications, vol. 11, No. 5, Jun. 1993, pp. 785–793, NY, US, p. 789, column 2, line 50–line 52.

United States Postal Service, XP002137734, "Information Based Indicia Program PSD Specification (Draft)", Jun. 13, 1996, p. 2–1, line 1–15.

United States Postal Service, XP002137990, "Information Based Indicia Program Host System Specification (Draft)", Oct. 9, 1996, p. 7, Paragraph 3.1.2.

* cited by examiner

Primary Examiner—Tod R. Swann
Assistant Examiner—Paul E. Callahan
(74) Attorney, Agent, or Firm—Charles R. Malandra, Jr.; Michael E. Melton

(57) ABSTRACT

A PSD has a private key which is associated with a specific public key that is stored in the host PC. The host PC sends the PSD public key private key to the PSD. If the PSD determines that the received PSD public key corresponds to its private key, the system has determined that the expected PSD is connected to the Host system and the PSD is activated to accept postal value requests from the host PC. Additionally, a PSD state identification, such as a checksum of a PSD transaction log file stored in the host may be verified by the PSD, which also has stored therein a PSD transaction log file. In this manner the PSD verifies that the PSD has performed all transactions with the host PC sending the checksum. Methods for verifying in the PSD that the expected host PC is coupled to the PSD mirrors the two embodiments for verifying the expected PSD.

8 Claims, 4 Drawing Sheets

US 6,260,144 B1

METHOD FOR VERIFYING THE EXPECTED POSTAL SECURITY DEVICE IN A POSTAGE METERING SYSTEM

RELATED APPLICATIONS

The present application is related to the following U.S. patent applications Ser. Nos. 08/754,570, 08/754,578 and 08/754,569, each filed concurrently herewith, and assigned to the assignee of the present invention.

FIELD OF THE INVENTION

The present invention relates generally to a system and method for postage metering security and, more particularly, to systems and methods for verifying authorized postal security devices.

BACKGROUND OF THE INVENTION

The Information-Based Indicia Program (IBIP) is a distributed trusted system proposed by the United States Postal Service (USPS). The IBIP is expected to support new methods of applying postage in addition to, and eventually in lieu of, the current approach, which typically relies on a postage meter to mechanically print indicia on mailpieces. The IBIP requires printing large, high density, two dimensional (2-D) bar codes on mailpieces. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

The user infrastructure, which resides at the user's site, comprises a postal security device (PSD) coupled to a host system. The PSD is a secure processor-based accounting device that dispenses and accounts for postal value stored therein. The host system may be a personal computer (PC) or a meter-based host processor. Among the various requirements set forth in the Host System Specification is that the host system verifies that the coupled PSD is "the expected PSD". Conventional postage metering devices and recent digital metering devices, such as PostPerfect and Personal Post Office, both manufactured by the assignee of the present invention, do not include such verification. Thus, a method for achieving such verification is desired.

U.S. Pat. No. 5,510,992 discloses a method whereby the host PC verifies that a storage means that is coupled to the host PC and has postal value stored therein, is authorized for use with the host PC. The method comprises the steps of storing a unique identifier, such as a serial number, in the storage means when the storage means is filled with postal value, and sending the unique identifier to the host PC when postage value is requested for dispensing. The host PC then verifies that the storage means is authorized for use with the host PC by confirming that the unique identifier retrieved from the storage device is the same as one stored in the host PC. Although such method verifies that the storage means is the expected storage device, the storage means is not a PSD because it is not a processor-based accounting device that dispenses and accounts for postal value stored therein. Furthermore, the verification of the serial number in the host PC is subject to fraud.

SUMMARY OF THE INVENTION

It has been found that the present invention provides a more secure and reliable system and method for verifying the expected PSD is coupled to the host PC. It has further been found that the present invention provides a secure and reliable system and method for verifying the expected host PC is coupled to the PSD.

The present invention provides a secure and reliable method for verifying in the host system that the expected PSD is coupled to the host system. In accordance with the present invention, the PSD has a private key which is associated with a specific public key that is stored in the host PC. The host PC sends the PSD public key to the PSD. If the PSD determines that the received PSD public key corresponds to its private key, the system has determined that the expected PSD is connected to the Host system and the PSD is activated to accept postal value requests from the host PC. Additionally, a PSD state identification, such as a checksum of a PSD transaction log file stored in the host may be verified by the PSD, which also has stored therein a PSD transaction log file. In this manner the PSD verifies that the PSD has performed all transactions with the host PC sending the checksum. A method for verifying that the expected host is coupled to the PSD mirrors the method for verifying the expected PSD.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

In describing the present invention, reference is made to the drawings, wherein there is seen system and methods for verifying the expected postal security device in a host system and conversely verifying the expected host system.

Figure 1:
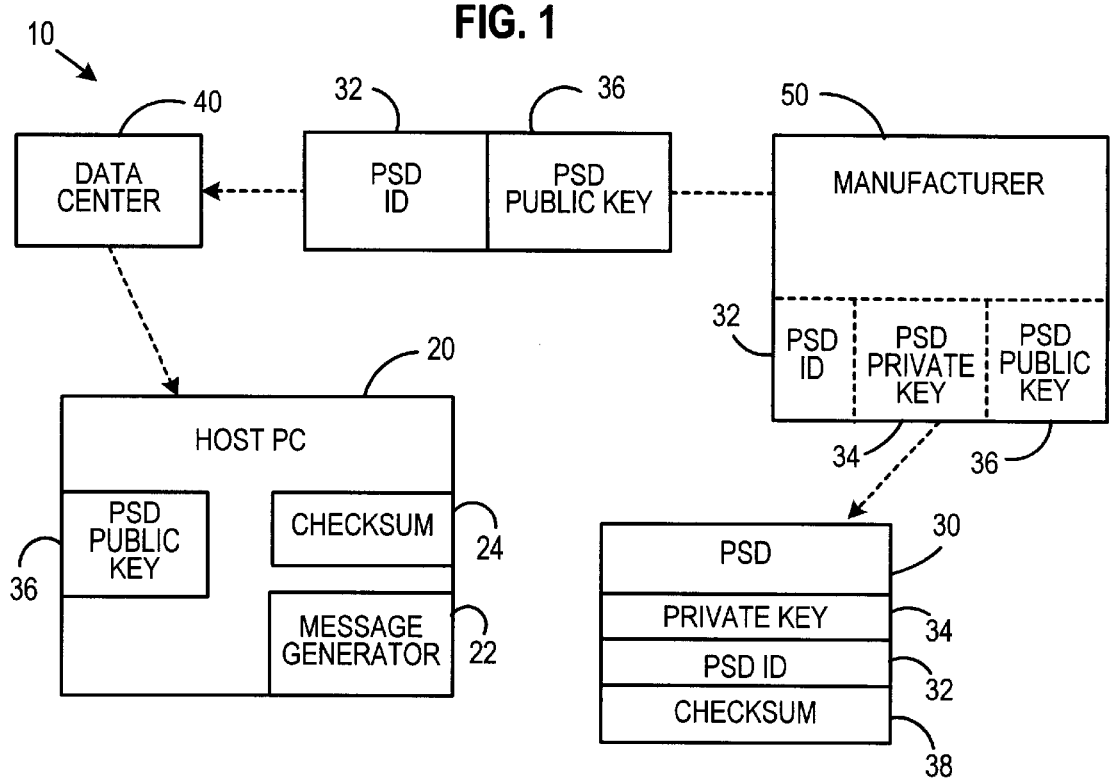
FIG. 1 is a block diagram of a postage metering system in accordance with the present invention showing a process for storing keys in a host system and a PSD coupled thereto.

Referring now to FIG. 1, a postage metering system, generally designated 10, includes a Host PC 20 coupled to a PSD 30, a Data Center 40 and a manufacturer 50. The manufacturer 50 initializes PSD 30 with an identification number, such as PSD ID 32, and a cryptographic key, such as PSD private key 34. The manufacturer 50 also sends the PSD ID 32 and a cryptographic key corresponding to the key in the PSD 30, such as PSD public key 36, to the Data Center 40. The Data Center 40 then sends the PSD ID 32 and the public key 36, to the Host PC 20. For the purpose of describing the present invention, the PSD private and public keys are stored in PSD 30 and Host PC 20 respectively. It will be understood that a secret key shared by the Host PC and the PSD may be used in place of such key pair.

The Host PC 20 and PSD 30 each include a microprocessor and memory (not shown). The Host PC 20 further includes a message generator 22 for generating a message. The message may be a random number or may include data indicating status of the PSD, for example a checksum 24 of PSD transaction records stored as log files in Host PC 20. For the following description of the present invention checksums will be used. The PSD records stored in Host PC 20 correspond to PSD records stored in PSD 30 for each transaction by PSD 30. For a more detailed description of such storage of PSD records see U.S. patent application Ser. No. 08/574,743, now U.S. Pat. No. 5,793,867 filed Dec. 19, 1995 and assigned to the assignee of the present invention, which incorporated herein by reference.

Figure 2:
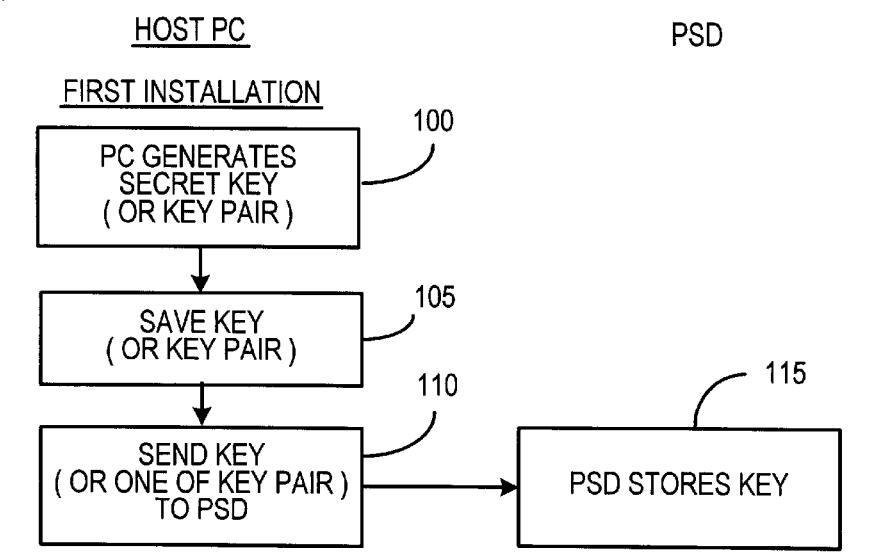
FIG. 2 is a flow chart showing an alternate process for storing keys in a host system and a PSD coupled thereto.

Referring now to FIG. 2, an alternate method for initializing the PSD with a cryptographic key is shown. At step 100, Host PC 20 generates a secret key or a key pair. The key or key pair is stored in Host PC 20, at step 105. Host PC 20 then sends the secret key or one of the keys of the key pair to PSD 30, at step 110. PSD 30 stores the key received from Host PC 20, at step 115.

Figure 3:
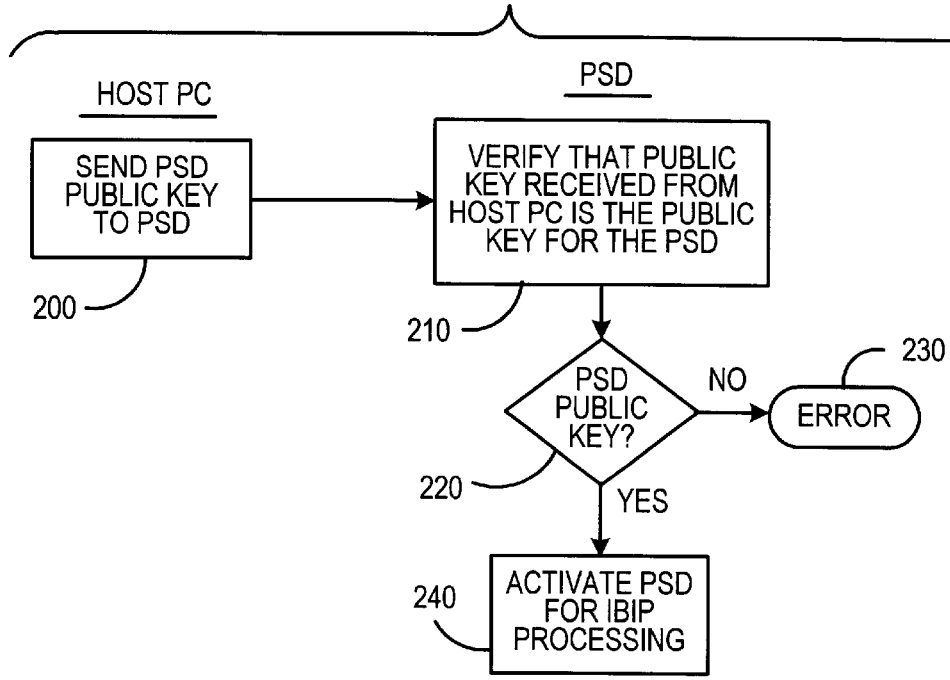
FIG. 3 is a flow chart of a preferred method for verifying the expected PSD is coupled to the host system.

Referring now to FIG. 3, a method is shown for verifying that the expected PSD 30 is coupled to Host PC 20. At step 200, the Host PC sends the PSD public key stored in the Host PC to the PSD. At step 210, the PSD determines if the public key received is the public key corresponding to the PSD private key stored in the PSD. If not at step 220, then, at step 230, an error is flagged that the expected PSD is not coupled to the Host PC. If the public key received does correspond at step 220 to the PSD private key in PSD 30, then, at step 240, the expected PSD has been verified and the PSD is activated for IBIP processing.

Figure 4:
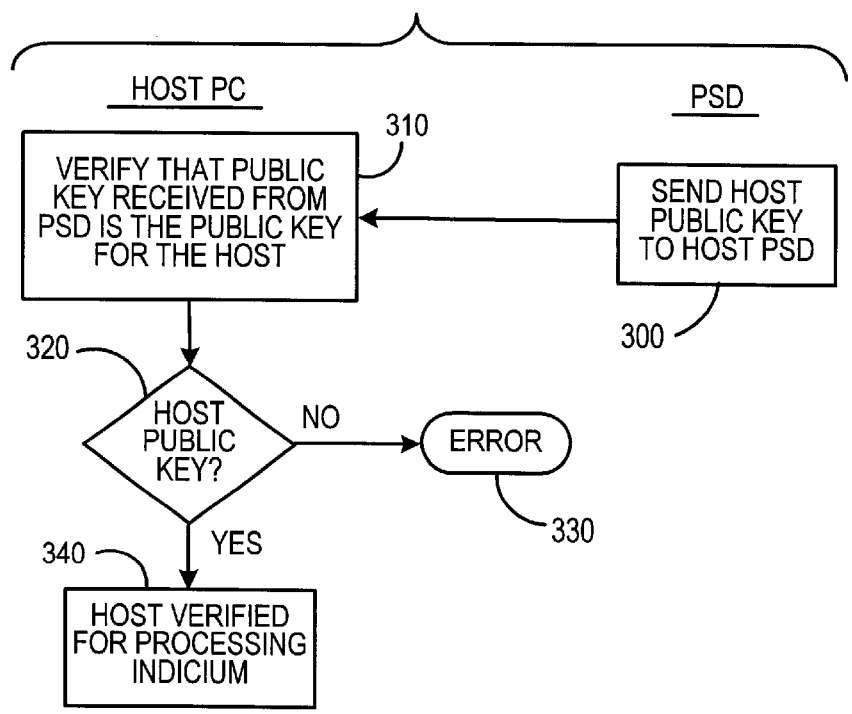
FIG. 4 is a flow chart of showing a method corresponding to that of FIG. 3 for verifying the expected host system.

Referring now to FIG. 4, it may be required that, in addition to verifying the expected PSD, the system verify the expected Host PC. In the preferred embodiment of the present invention, such verification of the expected Host PC mirrors the process for verifying the expected PSD as set forth above. At step 300, the PSD sends the Host PC public key stored in the PSD to the Host PC. At step 310, the Host PC determines if the public key received is the public key corresponding to the Host PC private key stored in the Host PC. If not at step 320, then, at step 330, an error is flagged that the expected Host PC is not coupled to the PSD. If the public key received does correspond at step 320 to the Host PC private key in Host PC 20, then, at step 340, the expected Host PC has been verified.

Figure 5:
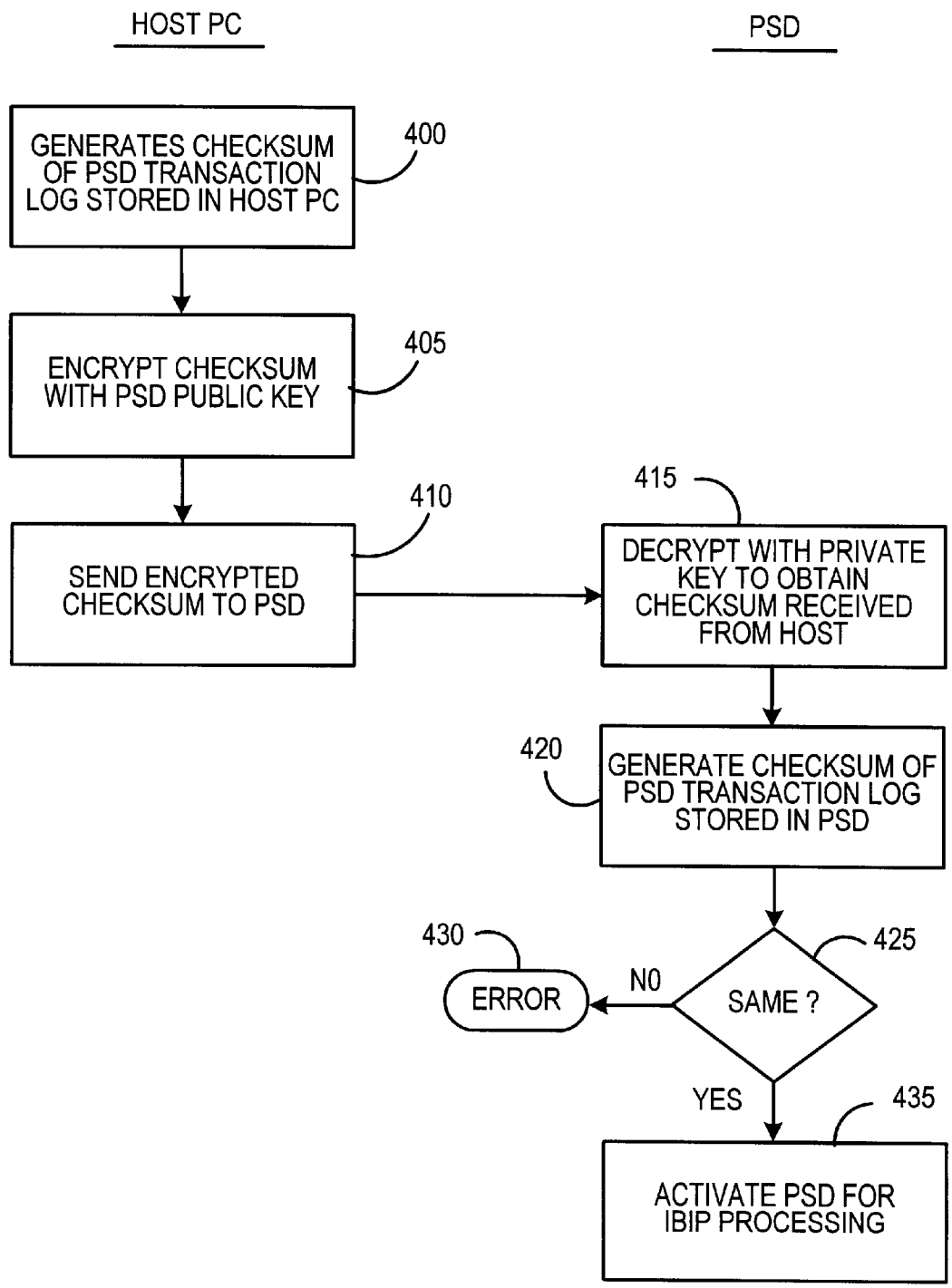
FIG. 5 is a flow chart of an alternate method for verifying the expected PSD is coupled to the host system.

Referring now to FIG. 5, an alternate method for verifying the expected PSD is shown. At step 400, the Host PC generates a message. In accordance with the present invention, the message may be in the form of a checksum of a PSD transaction log stored in the Host PC or any other PSD state identification that corresponds to data also stored in the PSD. The Host PC encrypts the message with the PSD public Key, at step 405, and sends the message to the PSD, at step 410. At step 415, the PSD decrypts the received encrypted message, such as the checksum. At step 420, the PSD generates a checksum of the transaction log stored in the PSD (or other PSD state identification corresponding to the message generated by the Host PC). At step 425, the PSD compares the decrypted checksum received with the checksum generated by the PSD. If the checksums are not the same, then an error is flagged, at step 430, indicating that there is a discrepancy between the PSD logs stored in the Host PC and the PSD. If the checksums are the same then, at step 435, the PSD is activated for IBIP processing.

Figure 6:
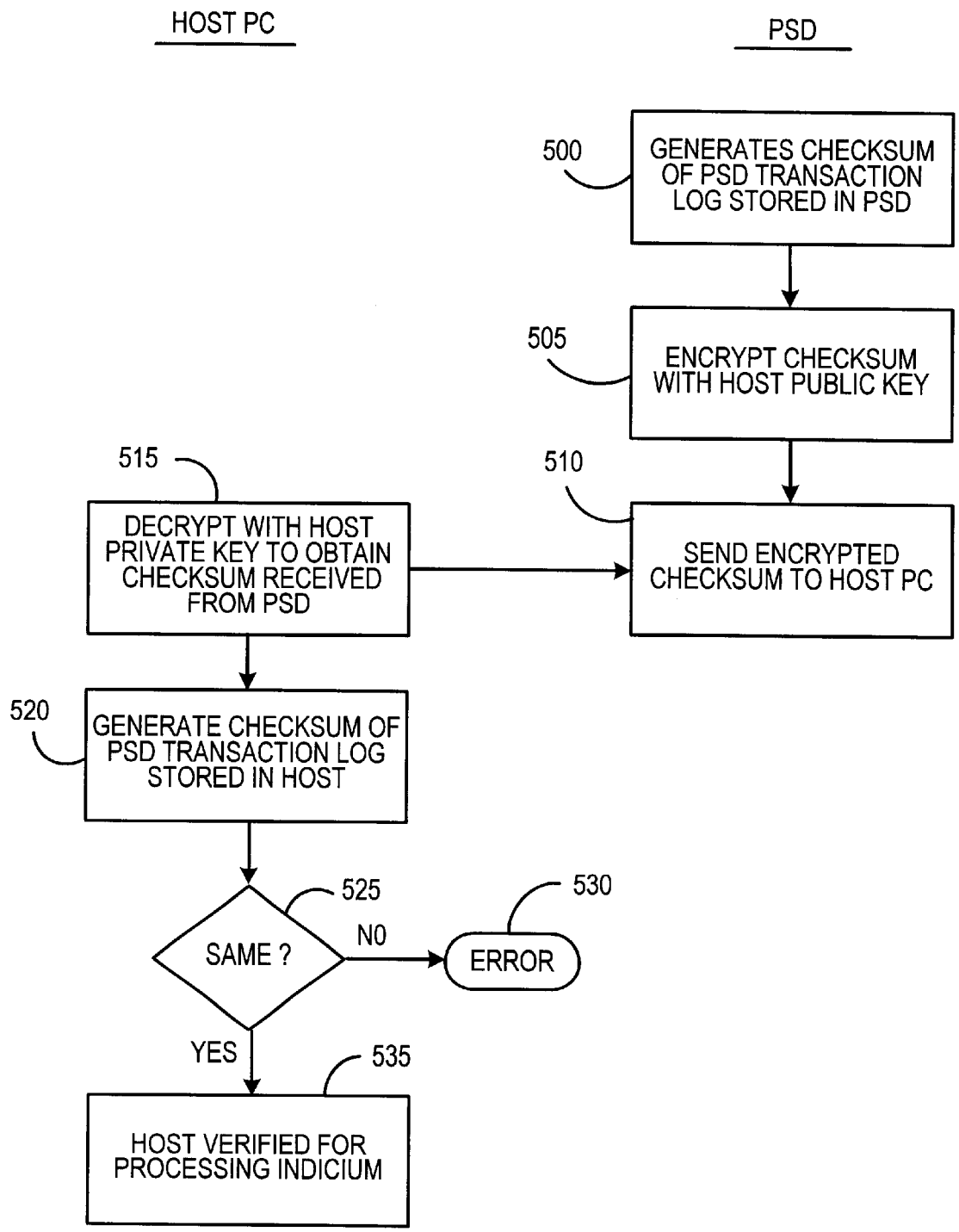
FIG. 6 is a flow chart of showing an alternate method corresponding to that of FIG. 5 for verifying the expected host system.

Referring now to FIG. 6, an alternate method for the PSD verifying that the expected Host PC is coupled to the PSD is shown which mirrors the process for verifying the expected PSD as shown in FIG. 5.

At step 500, the PSD generates a message in the form of a checksum of the PSD transaction log stored in the PSD or any other PSD state identification that corresponds to data also stored in the Host PC. The PSD encrypts the message with the Host PC public Key, at step 505, and sends the message to the Host PC, at step 510. At step 515, the Host PC decrypts the received encrypted message, such as the checksum. At step 520, the Host PC generates a checksum of the PSD transaction log stored in the Host PC (or other PSD state identification corresponding to the message generated by the PSD). At step 525, the Host PC compares the decrypted checksum received with the checksum generated by the Host PC. If the checksums are not the same, then an error is flagged, at step 530, indicating that there is a discrepancy between the PSD logs stored in the Host PC and the PSD. If the checksums are the same then, at step 535, the Host PC has been verified as the expected Host PC.

It has been found that the present invention is suitable for use with any security device that is coupled to a host system in an unsecured manner. For example, the present invention could be used for a certificate metering system such as disclosed in U.S. patent application Ser. No. 08/518,404, now U.S. Pat. No. 5,638,669 filed Aug. 21, 1995, assigned to the assignee of the present invention, and incorporated herein by reference.

While the present invention has been disclosed and described with reference to specific embodiments thereof, it will be apparent, as noted above, that variations and modifications may be made therein. It is, thus, intended in the following claims to cover each variation and modification, including a certificate metering system, that falls within the true spirit and scope of the present invention.

What is claimed is:

1. A method for verifying that a postal security device (PSD) is the expected PSD and that the PSD has not completed transactions with any other host system, the method comprising the steps of:

generating a first message in the host system, said first message representing a first PSD status after a last transaction between the host system and any PSD, said first message including data representing at least first transaction dependent data from a first transaction record stored in the host system during the last transaction between the host system and said any PSD, said first transaction dependent data changing for each transaction between the host system and said any PSD;

encrypting the first message with an encryption key stored in the host system;

sending the encrypted first message to the PSD;

decrypting the encrypted first message with a decryption key stored in the PSD;

generating a second message in the PSD, said second message representing a second status of the PSD after the last transaction between any host system and the PSD, said second message including data representing at least second transaction dependent data from a second transaction record stored in the PSD during the last transaction between said any host system and the PSD, the second transaction dependent data changing for each transaction between the PSD and said any host system; and comparing the second message to the decrypted first message.

2. The method of claim 1 further comprising the step of activating the PSD for transaction processing when the second message is the same as the decrypted first message.

3. The method of claim 1 wherein the host system is a personal computer.

4. The method of claim 1 wherein the first and second transaction dependent data include at least one of a checksum, control sum, ascending register, descending register and random number from the previous transaction.

5. The system of claim 1 wherein the decryption key and encryption key are identical.

6. The system of claim 1 wherein the decryption key and the encryption key are different.

7. The system of claim 1 wherein the decryption key is a private key of a key pair and the encryption key is a public key of the key pair.

8. The method of claim 1 wherein the data respectively representing said first and second transaction dependent data is a checksum of said first and second transaction dependent data.

* * * * *